Feb. 19, 1935.  C. E. TARTE  1,992,133
APPARATUS FOR CONTACTING LIQUIDS
Filed Aug. 25, 1932
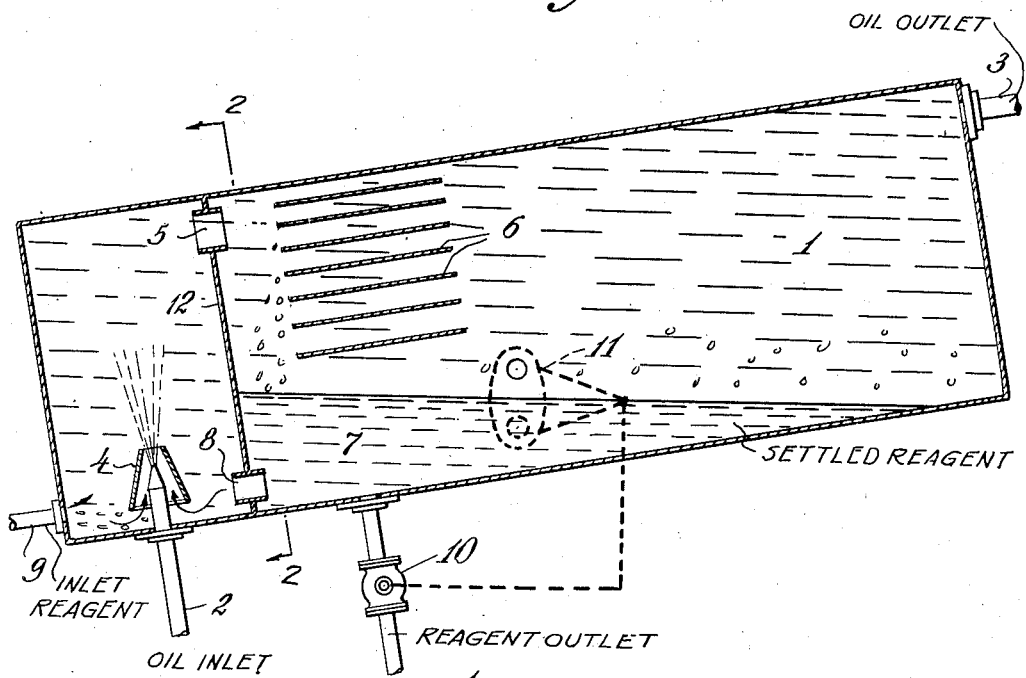
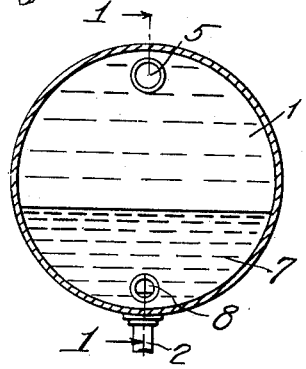
Charles E. Tarte
INVENTOR
BY
Dallas R. Lamont
ATTORNEY Patented Feb. 19, 1935

1,992,133

UNITED STATES PATENT OFFICE 1,992,133

APPARATUS FOR CONTACTING LIQUIDS

Charles E. Tarte, Augusta, Kans., assignor, by mesne assignments, to Socony-Vacuum Oil Company, Incorporated, New York, N. Y., a corporation of New York Application August 25, 1932, Serial No. 630,384

3 Claims. (Cl. 196—46)

This invention has to do with apparatus and means for treating one liquid with a second liquid largely nonmiscible with the first and differing in specific gravity therefrom. It is best applicable to those cases where the reagent is of greater specific gravity than the treated liquid, and where the character of the treatment is such that relatively great amounts of reagents should be contacted with the treated liquid, yet the net alteration or use of the reagent per contact is small.

For example, in the treating of petroluem distillates with caustic soda solutions for various purposes it is desirable that relatively great amounts of reagent should meet the oil at each contact in order that the reaction may be rapid and complete. Yet the consumption of reagent per contact is small, and the cost of reagent is relatively large so that economy as well as chemical theory dictate that the caustic be used many times before being wasted from the system.

Prior art systems for accomplishing this purpose are many. One of the most common makes use of closed vessels partially full of the caustic solution through which the oil is pumped. Another method consists of placing the two liquids in a vessel and agitating mechanically or with air. The liquids may be mixed in pipes, pumped through a pipe with orifice plates for further mixing and then led to a vessel for settling. Variations of the latter method make use of jet mixers, or centrifugal pumps to accomplish the mixing before introduction to the settling chamber.

A more recent device of the prior art comprises a settling vessel, in the bottom of which reagent collects. The entering stream of raw oil, by jet action, draws reagent from this collection space into a pipe outside the settler, mixes the oil and reagent in that pipe, receives in the same pipe a further dosage of fresh reagent and then enters the settling drum for separation.

It is the object of this invention to provide a cheaper, more compact, more convenient and more easily maintained apparatus for accomplishing the contact step outlined. It is an important object to provide such an apparatus which has a minimum of outside piping exposed to the action of corrosive agents, to provide a structure which may readily be fabricated of corrosion-resisting materials, and which is capable, if desired, of having all surfaces exposed to reagent cheaply covered with protective coating.

The apparatus has been designed in the first instance to facilitate the treating of a petroleum distillate with a water solution of caustic soda and for convenience and brevity the following discussion will be limited to that application. However, the apparatus is capable of far wider application and it should be understood that it lends itself to any operation where the essential is that of treating a liquid with another of differing specific gravity, and not solely limited to the terms of the present discussion.

In the chemical refining of petroleum distillates, more particularly in the refining of gasoline, frequent instances require the treatment of oil with caustic solution. In the commoner case, the oil has been treated with sulphuric acid, and has been freed from the sludge produced thereby. This oil must now be treated with alkali to remove any lingering traces of acidity. The demand upon the caustic alkali for any single step is not great and economy requires that the caustic be used repeatedly. In order that the action may be rapid and complete it is desirable that relatively great amounts of caustic be contacted with the gasoline. To avoid carry-over of caustic with the gasoline resulting in a subsequent loss of caustic in water washing of the gasoline, effective settling is required.

To meet these various requirements I have provided the apparatus of this invention. It is adapted to be used as the single unit of such a system, or a series of these units may be so interconnected that the material to be treated may flow through the units serially, meeting a different step of the treatment in each body. For example, acid treatment may be carried out in the first body, a water washing in the second body, caustic treatment in the third, and water washing in the last body. Or where the treatment with any one reagent requires successive steps, each step may be carried out in one of these units. In such cases, it may frequently be found desirable to so connect the units that reagents may flow from unit to unit in a direction counter to flow of oil, so that the most nearly exhausted reagent meets the least treated oil.

In order that my invention may be made clear I have attached to and made a part of this specification a drawing showing my preferred form of apparatus.

In the drawing Figure 1 shows a sectional view of the apparatus taken vertically along a longitudinal center line, and Figure 2 shows a sectional view taken at right angles to the longitudinal center line.

In Figure 1 of the drawing, 1 indicates a vessel or container, divided into two portions by a partition 12. This vessel is indicated as being placed in a sloping position, with the longer axis rising toward the exit 3, but it may equally well be placed in a horizontal position. 2 indicates an entry pipe for the oil to be treated, and 3 an exit pipe for the same oil. 4 is a hood or Venturi device whereby the incoming jet of oil may pick up and entrain the caustic in the mixing chamber. The mixed caustic and oil pass through orifice 5 in partition 12 and encounter baffles 6. These baffles 6 are preferably placed in a sloping position, with their lowest end presented to the oncoming mixture. When the entire body 1 is set upon a slope, these baffles may be parallel to its longest axis, but when the body 1 is set horizontal the slope of the baffles should be maintained. The baffles 6 serve to entrain and agglomerate the droplets of reagent and promote settling. Droplets not thus separated settle out in the settling space further provided. The settled reagent collects in a body indicated by 7 and returns to the mixing chamber by orifice 8 in partition 12. Fresh reagent may enter through line 9 and spent reagent may be drawn off through valve 10, actuated by float control 11 acting upon the interface between oil and reagent.

Figure 2 is a sectional view showing in detail the arrangement of openings 5 and 8 in partition 12.

This apparatus has the advantage over many prior art set-ups in that it is entirely free from moving parts in contact with reagent. It has a further advantage in being substantially free from external piping. Probably the most important advantage results from the simple construction. If the use to which it is put allows the use of iron or steel, it may be fabricated from simple plates and shapes by welding. It may with equal ease be fabricated similarly of corrosion resisting metals. In severe service cases, the shape and fittings are such that it may cheaply be lined with lead, or rubber, and the jet and baffles may in such cases be made of lead, hard rubber, or stoneware. The entire apparatus may be made, if desired, of stoneware or glass without sacrifice of efficiency.

The apparatus of this invention may be used not only for the purposes set forth above, but is equally applicable to such processes as the treatment of oils with liquid sulphur dioxide, the extraction of water soluble compounds from oils, the extraction of alcohol soluble compounds from oils, the extraction of ether soluble compounds from water; in fact it may be used in any process where the essential step is that of contacting one liquid with another which is largely non-miscible with the first and differs in specific gravity therefrom.

In view of the wide applicability of this apparatus I desire to claim it in the broadest equivalents, limited only by such limitations as appear in the following claims.

I claim:

1. Apparatus for contacting a liquid with a liquid reagent largely non-miscible with the said liquid and differing in specific gravity therefrom, comprising a container internally divided by a partition into a separating chamber and a mixing chamber, the relative elevation of such chambers being such that the settled reagent may flow by gravity from the settling chamber to the mixing chamber, means to introduce settled reagent from settling chamber to mixing chamber, means to introduce raw liquid to mixing chamber, means to introduce fresh reagent to mixing chamber, means actuated by the velocity of incoming raw liquid to entrain settled reagent and fresh reagent with incoming liquid, means to transfer mixture from mixing chamber to settling chamber, means to withdraw reagent and means to withdraw treated liquid.

2. Apparatus for contacting a liquid with a liquid reagent largely non-miscible with the said liquid and differing in specific gravity therefrom, comprising a container internally divided by a partition into a separating chamber and a mixing chamber, the relative elevation of such chambers being such that the settled reagent may flow by gravity from the settling chamber to the mixing chamber, means communicating between the mixing chamber and the bottom of the separating chamber, means communicating between the top of the mixing chamber and the separating chamber, means to introduce raw liquid to be treated into the mixing chamber, entrainment means in the mixing chamber actuated by the velocity of incoming raw liquid, means for introducing fresh reagent to the mixing chamber, means for withdrawing reagent from the separating chamber, and means for withdrawing treated liquid from the separating chamber, said means being so located that said container is maintained substantially filled with liquid.

3. Apparatus for contacting a liquid with a liquid reagent largely non-miscible with the said liquid and differing in specific gravity therefrom, comprising a container internally divided by a partition into a mixing chamber and a separating chamber, the relative elevation of such chambers being such that the settled reagent may flow by gravity from the settling chamber to the mixing chamber, means communicating between the bottom of the separating chamber and the mixing chamber, means for introducing fresh reagent to the mixing chamber, means for introducing raw liquid to be treated into the mixing chamber, entrainment means in the mixing chamber actuated by the velocity of incoming raw liquid, means communicating between the top of the mixing chamber and the settling chamber, a series of baffles opposed to the stream from last mentioned communicating means, means for removing reagent from the settling chamber and means for removing treated liquid from the settling chamber, said means being so located that said container is maintained substantially filled with liquid.

CHARLES E. TARTE.